(No Model.) 2 Sheets—Sheet 1.
C. A. SCHOESSEL.
SAW SWAGE.
No. 531,222. Patented Dec. 18, 1894.
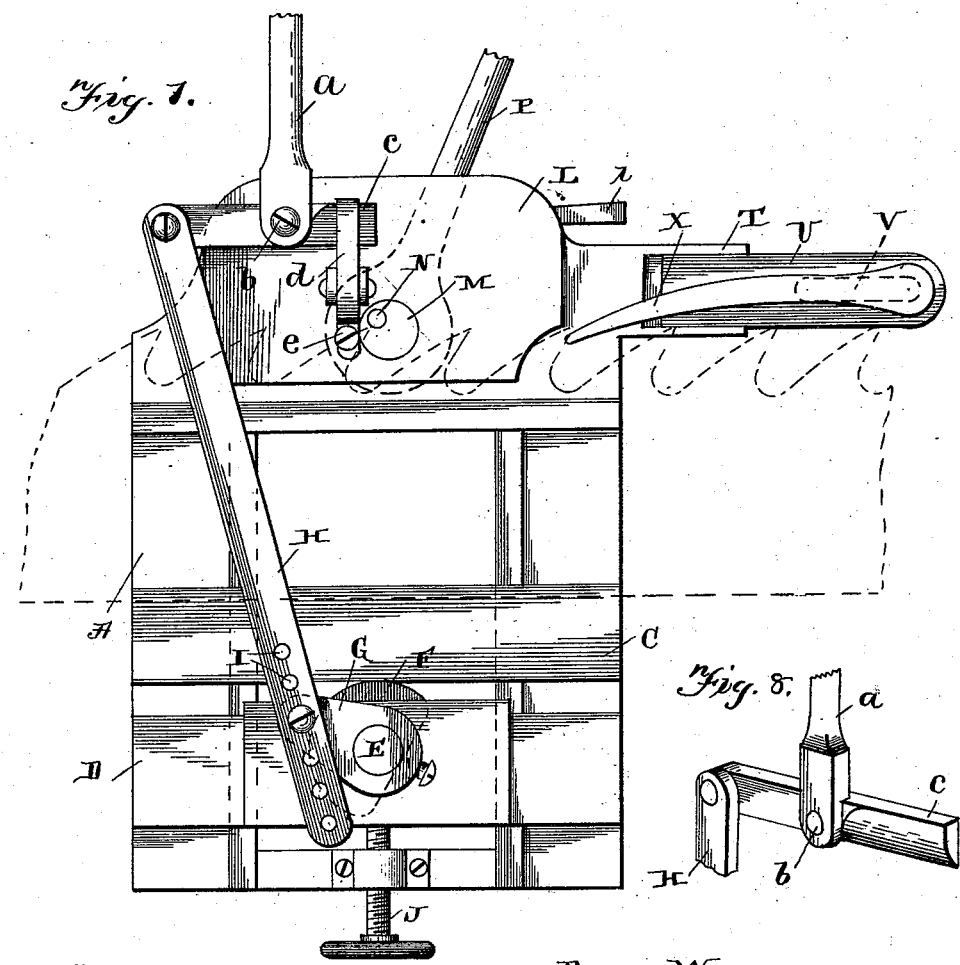
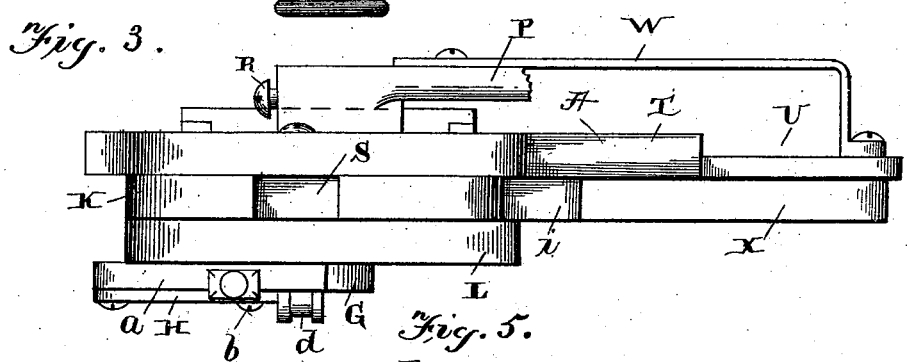
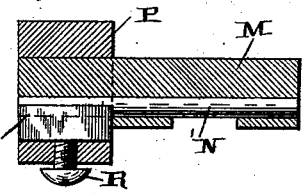
WITNESSES
Geo. E. Frech.
James W. Evans.
INVENTOR
C. A. Schoessel,
per Lehmann Pattison Nesbit
attys
THE NORRIS PETERS CO., PHOTO-LITHO., WASHINGTON, D. C.

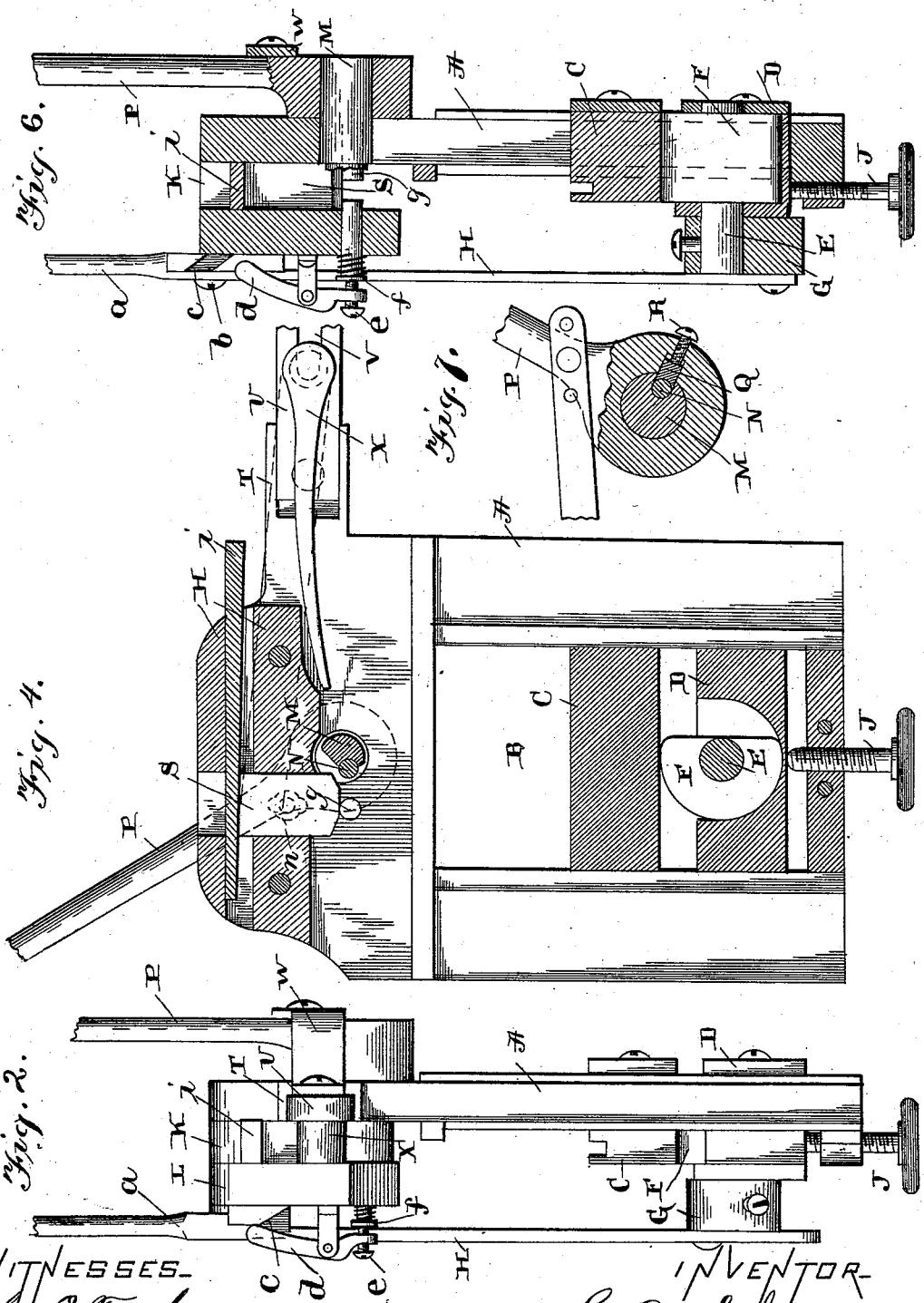

UNITED STATES PATENT OFFICE.

CHRISTIAN A. SCHOESSEL, OF ROCK ISLAND, ILLINOIS.

SAW-SWAGE.

SPECIFICATION forming part of Letters Patent No. 531,222, dated December 18, 1894.

Application filed June 7, 1894. Serial No. 513,807. (No model.)

*To all whom it may concern:*

Be it known that I, CHRISTIAN A. SCHOESSEL, of Rock Island, in the county of Rock Island and State of Illinois, have invented certain new and useful Improvements in Saw-Swages; and I do hereby declare the following to be a full, clear, and exact description of the invention, such as will enable others skilled in the art to which it pertains to make and use it, reference being had to the accompanying drawings, which form part of this specification.

My invention relates to improvements in saw swages and it consists in the construction and arrangement of parts which will be fully described hereinafter and particularly referred to in the claims.

The object of my invention is to provide a saw swage having a lever for raising the saw and clamping it at the same time, and a lever operating a die for swaging the tooth, and at the same time provided with a connection when moved in the opposite direction for moving the saw forward through the next tooth; and it also relates to the particular shape of the anvil die and the operating die all of which will be fully described hereinafter.

In the accompanying drawings:—Figure 1 is a side elevation of a saw swage which embodies my invention. Fig. 2 is an end view of the same. Fig. 3 is a top plan view. Fig. 4 is a vertical longitudinal sectional view. Fig. 5 is a detached view of the operating anvil. Fig. 6 is a transverse vertical sectional view at right angles to Fig. 4. Fig. 7 is a detail transverse sectional view, showing the method of connecting the handle P and the shaft M, and of holding the die N. Fig. 8 is a detached perspective view of the lever *a*.

A indicates the frame work provided with an opening B which forms a guide-way as will appear presently. Placed within this guide-way is a vertically moving saw support C, which rests upon a second sliding support D, which last support has journals bearing a shaft E having secured intermediate its ends a cam F. Attached to one end of this cam shaft is a crank G to which a rod H is connected by means of a screw or bolt, the lower end of said rod being provided with a series of perforations I for the purpose of adjustment, and the opposite end connected in a manner to be fully set forth farther on. An adjusting screw J is in the lower end of the frame A and rests against the under side of the cam support or carrier D for the purpose of adjusting the same vertically to accommodate itself to saws of different widths for the purpose of bringing the same to the proper point for swaging as will be readily understood.

At the upper end of the frame A is a laterally extending projection K, having attached to its end a cover L. Pivotally supported by the frame A and the said cover L is an operating die shaft M, having at one side an opening which receives a steel die N. One end of this shaft M is provided with a handle P, and at this end there is a feather Q which bears against the said steel die N and held in position by means of a set screw R. Owing to this arrangement the said die N can be moved endwise for the purpose of utilizing its entire length in operation against the stationary anvil die S. This anvil die S has its anvil side formed on an angle different from the angle of the back of the saw tooth, so that when the saw is raised against it, it will bear heavier on the point, and the action of the operating die when turned by its operating lever is such that it will force the saw slightly endwise under the anvil, and cause the tooth to bend forward on the point. After this the tooth is spread in the further action of the operating die when it is brought forward, thus not making any impression or indenture back of the face of the tooth, leaving it stronger than in other methods heretofore practiced.

Extending outward from the upper end of the frame A is an arm T to which an adjustable arm U is attached, which arm is provided with a longitudinal slot V through which a bolt extends from a rod W the opposite end of the said rod W being connected with the operating lever P which moves the operating die. This end of the said rod W is provided with a series of perforations for the purpose of adjustment, and the said bolt which passes through the slot V of the arm U is attached to a pawl X which rests by gravity in the teeth of the saw. The operation of this is that when the lever is moved forward for the purpose of swaging a tooth of the saw, the pawl X is moved with the same into the next tooth of the saw. When the said lever is moved in the opposite direction for the purpose of fixing it ready for swaging the next tooth, the pawl X engages the tooth of the saw and moves it forward bringing the next tooth in position to be swaged.

Pivoted to the outer side of the cover L is a clamping and raising lever $s$ pivoted at the point $b$ its lower end being connected with the upper end of the rod H, whereby when the handle $a$, which is rigidly attached to the lever $s$, is moved forward the cam shaft is turned and the said cam moved upward and made to engage the under side of the saw support C thus moving the said saw upward and bringing its tooth in contact with the stationary anvil die. The opposite end of the lever $s$ is beveled as shown at $c$ which beveled portion engages the upper end of an intermediately pivoted lever $d$ the opposite end of said lever being provided with a screw $e$. Directly inside and engaged by this screw $e$, is a spring actuated endwise moving clamp $f$ which co-operates with a companion clamp $g$ extending in the opposite direction. When in their normal positions by means of the spring around the said movable clamp, there is sufficient space between the clamps to receive the said saw. When however the lever $s$ is moved forward it draws the saw upward by contact of the cam with the under side of the support C as will be readily understood thus bringing the circular portion of the said cam under the support C before the flat surface of the lever $s$ engages the lever $d$. At this portion of the motion of the lever $s$ the lever $d$ is forced inward thus forcing the endwise moving clamp $f$ inward and clamping the saw in this position after which the operating die is turned by means of its handle as before described and the tooth swaged.

In operation the saw is placed upon the support C and through the medium of the adjustable screw at the lower end of the frame A the two supports C and D are adjusted in the proper position to bring the saw tooth against the stationary anvil die when the lever $s$ is operated. Then the lever $s$ is operated carrying the saw upward and afterward clamping it at a point near the swaging point, thus holding it firmly. The lever P is then drawn forward which turns the operating die and swages the tooth. The lever $s$ is then moved in the opposite direction which lowers the saw. After this the lever P is moved in the opposite direction which brings the pawl X in engagement with the tooth of the saw thus moving it forward to bring the next tooth into engagement as before stated.

From the above description it will be seen that I have produced a very simple and durable saw swage having the advantages enumerated.

The stationary die S is held into position by means of a key $i$ moving in a slot in the portion K, and a clamping screw $n$ as clearly shown.

Having thus described my invention, what I claim, and desire to secure by Letters Patent, is—

1. A saw swage comprising a frame, a swaging die at the upper end thereof, a vertically adjustable support D upon said frame, an adjustable means carried by the said frame and engaging said support, an oscillating cam carried by said support above the adjusting means, an operating handle for said cam, and a saw carrier supported by said cam, substantially as specified.

2. A saw swage comprising a frame, a swaging die at the upper end thereof, a saw carrier, a vertically adjustable support D, a cam carried by said support and engaging said saw carrier, a laterally moving clamp for said saw, a lever for operating said clamp, and an adjustable connection between said clamping lever and the vertically adjustable cam, substantially as described.

3. A saw swage comprising a frame, a swaging die carried thereby, a saw support, a laterally moving clamp for the saw, an intermediately pivoted clamping lever $d$ having one end engaging said clamp, and a lever moving in a plane at right angles to the clamping lever and engaging the opposite end of said lever $d$, substantially as set forth.

4. A saw swage comprising a frame, a swaging die carried thereby, a saw support, a laterally moving clamp for the saw, a means for moving the saw support, an intermediately pivoted lever $d$ having one end engaging the said clamp, a lever $s$ pivoted at right angles to the lever $d$ and having an incline engaging the opposite end of said lever, and a connection between the lever $s$ and the said saw support operating means, substantially as described.

5. A die for a saw swage consisting of a rotating member having a longitudinal opening and a lateral cut out portion to said opening, an endwise adjustable die in said longitudinal opening, and a laterally moving feather for holding the die, substantially as described.

6. A die for a saw swage comprising a rotating member having a longitudinal opening, an endwise adjustable swaging die within the said opening, a lever connected to the rotating die, a feather engaging the said swaging die, and a clamping screw passing through the said lever and engaging the feather substantially as described.

In testimony whereof I affix my signature in presence of two witnesses.

C. A. SCHOESSEL.

Witnesses:
GUSTAF SWENSSON,
ALBERT P. GLASS.